(12) United States Patent
Zhang et al.

(10) Patent No.: US 10,945,155 B2
(45) Date of Patent: Mar. 9, 2021

(54) METHOD AND APPARATUS FOR TRANSMITTING BUFFER STATUS REPORT

(71) Applicant: HUAWEI TECHNOLOGIES CO., LTD., Guangdong (CN)

(72) Inventors: Lili Zhang, Beijing (CN); Guorong Li, Shenzhen (CN); Aimin Justin Sang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/343,320

(22) PCT Filed: Apr. 19, 2017

(86) PCT No.: PCT/CN2017/081139
§ 371 (c)(1),
(2) Date: Apr. 18, 2019

(87) PCT Pub. No.: WO2018/072418
PCT Pub. Date: Apr. 26, 2018

(65) Prior Publication Data
US 2020/0187047 A1    Jun. 11, 2020

(30) Foreign Application Priority Data
Oct. 19, 2016    (CN) .......................... 201610912425.9

(51) Int. Cl.
*H04W 28/02*    (2009.01)
*H04W 76/27*    (2018.01)
(Continued)

(52) U.S. Cl.
CPC ...... *H04W 28/0278* (2013.01); *H04B 7/2612* (2013.01); *H04W 16/28* (2013.01); *H04W 72/046* (2013.01); *H04W 76/27* (2018.02)

(58) Field of Classification Search
CPC ............. H04W 28/0278; H04W 16/28; H04W 72/046; H04W 80/04; H04W 84/12;
(Continued)

(56) References Cited

U.S. PATENT DOCUMENTS

2013/0044699 A1\* 2/2013 Eriksson ........... H04W 72/1289
370/329
2014/0293873 A1    10/2014 Tseng
(Continued)

FOREIGN PATENT DOCUMENTS

CN         103139918 A      6/2013
CN         103533662 A      1/2014
(Continued)

OTHER PUBLICATIONS

Extended European Search Report issued in European Application No. 17862052.2 dated Sep. 6, 2019, 8 pages.
(Continued)

*Primary Examiner* — Brenda H Pham
(74) *Attorney, Agent, or Firm* — Fish & Richardson P.C.

(57) ABSTRACT

This application relates to the field of communications technologies, and discloses a method and an apparatus for transmitting a buffer status report, to help enhance mobility management on a terminal. The method may include: receiving, by a terminal, an instruction message, where the instruction message is used to instruct the terminal to report a BSR, the BSR includes at least one of a first BSR and a second BSR, the first BSR is a BSR corresponding to a first beam link, and the second BSR is a BSR corresponding to a second beam link; and then, reporting, by the terminal, the BSR on the first beam link according to the instruction message.

20 Claims, 7 Drawing Sheets

(51) Int. Cl.
*H04B 7/26* (2006.01)
*H04W 16/28* (2009.01)
*H04W 72/04* (2009.01)

(58) Field of Classification Search
CPC ..... H04W 88/06; H04W 88/08; H04W 84/18; H04W 74/08; H04B 7/2612
See application file for complete search history.

(56) References Cited

U.S. PATENT DOCUMENTS

| | | |
|---|---|---|
| 2014/0307663 A1 | 10/2014 | Huang et al. |
| 2015/0230082 A1 | 8/2015 | Li |
| 2016/0100397 A1 | 4/2016 | Wen et al. |
| 2016/0183234 A1* | 6/2016 | Sung .............. H04W 72/046 370/329 |
| 2017/0111886 A1* | 4/2017 | Kim .............. H04W 48/14 |
| 2017/0295502 A1 | 10/2017 | Stirling-Gallacher et al. |

FOREIGN PATENT DOCUMENTS

| | | |
|---|---|---|
| CN | 103781123 A | 5/2014 |
| CN | 104144511 A | 11/2014 |
| CN | 104144512 A | 11/2014 |
| CN | 104581679 A | 4/2015 |
| CN | 104661315 A | 5/2015 |
| CN | 104919741 A | 9/2015 |
| EP | 2775773 A1 | 9/2014 |
| EP | 3026970 A1 | 6/2016 |
| WO | 2014181177 A1 | 11/2014 |
| WO | 2014181181 A1 | 11/2014 |

OTHER PUBLICATIONS

3GPP TS 36321 V13.0.0 (Dec. 2015), "3rd Generation Partnership Project; Technical Specification Group Radio Access Network; Evolved Universal Terrestrial Radio Access (E-UTRA); Medium Access Control (MAC) protocol specification; (Release 13)," Dec. 2012, 82 pages.

PCT International Search Report and Written Opinion issued in International Application No. PCT/CN2017/081139 dated Jul. 11, 2017, 17 pages (with English translation).

R2-091635—LG Electronics Inc. et al., "Correction to BSR Triggering at Serving Cell Change," 3GPP TSG-RAN2 Meeting #65, Athens, Greece, Feb. 13, 2009, 3 pages.

R2-163365—Samsung, "Introduction of 'Cell' concept in 5G," 3GPP TSG-RAN WG2 Meeting #94, Nanjing, China, May 23-27, 2016, 4 pages.

R2-163437—Nokia et al., "Beam Terminology," 3GPP TSG-RAN WG2 Meeting #94, Nanjing, China, May 23-27, 2016, 3 pages.

R2-163484—MediaTek Inc., "Mobility Supporting for HF-NR," 3GPP TSG-RAN WG2 #94, Nanjing, China, May 23-27, 2016, 6 pages.

R2-163578—Intel Corporation, "Discussion of mobility related definition and terminology in NR," 3GPP TSG RAN WG2 Meeting #94, Nanjing, China, May 23-27, 2016, 3 pages.

RP-121800—NTT Docomo, Inc., "New Study Item Description: Small Cell Enhancements for E-UTRA and E-UTRAN—Higher-layer aspects," 3GPP TSG-RAN Meeting #58, Barcelona, Spain, Dec. 4-7, 2012, 5 pages.

RWS-120003—Ericsson, "Views on Rel-12," 3GPP RAN WS on Rel-12 and onwards, Ljubljana, Slovenia, Jun. 11-12, 2012, 23 pages.

RWS-120021—Samsung, "Technologies for Rel-12 and Onwardsm," 3GPP TSG RAN on Rel-12 and Onwards, PowerPoint Sideshow, Ljubljana, Slovenia, Jun. 11-12, 2012, 32 pages.

Office Action issued in Chinese Application No. 201780037940.X dated Dec. 26, 2019, 14 pages (with English translation).

Office Action issued in Chinese Application No. 201780037940.X dated Jul. 16, 2020, 15 pages (with English translation).

* cited by examiner

METHOD AND APPARATUS FOR TRANSMITTING BUFFER STATUS REPORT

CROSS-REFERENCE TO RELATED APPLICATIONS

This application is a National Stage of International Application No. PCT/CN2017/081139, filed on Apr. 19, 2017, which claims priority to Chinese Patent Application No. 201610912425.9, filed on Oct. 19, 2016. Both of the aforementioned applications are hereby incorporated by reference in their entireties.

TECHNICAL FIELD

This application relates to the field of communications technologies, and in particular, to a method and an apparatus for transmitting a buffer status report (BSR).

BACKGROUND

In a multi-linkage system, a terminal communicates with a base station through a beam link. Because of instability of a beam link, usually a plurality of beam links need to be established. The terminal sends a BSR on each of the plurality of beam links through the beam link, to notify the base station of an amount of data needing to be sent by the terminal. Each beam link corresponds to one BSR.

At present, the terminal triggers reporting of a BSR. For example, when uplink data of the terminal is empty and new data arrives, the terminal triggers reporting of a BSR, or the terminal periodically reports a BSR. In the multi-linkage system, the foregoing BSR reporting method cannot handle mobility management on the terminal.

SUMMARY

This application provides a method and an apparatus for transmitting a BSR, to help enhance mobility management on a terminal.

According to a first aspect, this application provides a method for transmitting a BSR. The method may include: receiving, by a terminal, an instruction message, where the instruction message is used to instruct the terminal to report a BSR, the BSR includes at least one of a first BSR and a second BSR, the first BSR is a BSR corresponding to a first beam link, and the second BSR is a BSR corresponding to a second beam link; and then, reporting, by the terminal, the BSR on the first beam link according to the instruction message. The technical solution supports transmission of a cross-beam-link-BSR. According to the technical solution, the terminal may send a BSR corresponding to a small cell link to help a macro base station or a primary serving node in a virtual cell determine mobility of the terminal more accurately, so that mobility management on the terminal is enhanced.

In a possible design, the BSR includes the second BSR; and the reporting, by the terminal, the BSR on the first beam link according to the instruction message may include: when the terminal sends a measurement report on the first beam link, reporting, by the terminal, the second BSR on the first beam link according to the instruction message.

In a possible design, the BSR includes the second BSR; and the reporting, by the terminal, the BSR on the first beam link according to the instruction message may include: when the terminal fails to trigger the second beam link, reporting, by the terminal, the second BSR on the first beam link according to the instruction message. Compared with establishing a new link and then reporting a BSR for communication, according to the implementation, a communication latency can be reduced.

In a possible design, the BSR includes the second BSR; and the receiving, by a terminal, an instruction message may include: receiving, by the terminal, a cross link request, where the cross link request is used to instruct the terminal to report, on the first beam link, a BSR corresponding to another beam link. The cross link request is a request message provided in an embodiment of this application.

In a possible design, the receiving, by a terminal, an instruction message may include: receiving, by the terminal, the instruction message by using physical layer signaling, MAC layer signaling, or RRC signaling.

In a possible design, the reporting, by the terminal, the BSR on the first beam link according to the instruction message may include: reporting, by the terminal, the BSR on the first beam link according to the instruction message by using physical layer signaling, MAC layer signaling, or RRC signaling.

According to a second aspect, this application provides a method for transmitting a BSR. The method may include: generating, by a network device, an instruction message, where the instruction message is used to instruct a terminal to report a BSR, the BSR includes at least one of a first BSR and a second BSR, the first BSR is a BSR corresponding to a first beam link, and the second BSR is a BSR corresponding to a second beam link; and then, sending, by the network device, the instruction message to the terminal.

In a possible design, the sending, by the network device, the instruction message to the terminal may include: sending, by the network device, the instruction message to the terminal by using physical layer signaling, MAC layer signaling, or RRC signaling.

In a possible design, the method may further include: receiving, by the network device by using physical layer signaling, MAC layer signaling, or RRC signaling, the BSR reported by the terminal.

For related explanations of any one of the technical solutions according to the second aspect and a beneficial effect that can be achieved by the technical solution, refer to the corresponding technical solution according to the first aspect, and details are not described herein again.

According to any one of the technical solutions provided in the first aspect or any one of the technical solutions provided in the second aspect, the instruction message may include an identifier of the BSR or an identifier of a beam link corresponding to the BSR. Optionally, the instruction message may further include an identifier of a cell corresponding to the BSR.

In a possible design, if the BSR is reported by using the MAC layer signaling, a format of the BSR includes any one of the following: the MAC layer signaling carries at least one of the identifier of the cell corresponding to the BSR and the identifier of the beam link corresponding to the BSR; or at least one of the identifier of the cell corresponding to the BSR and the identifier of the beam link corresponding to the BSR is indicated by using a logical channel identifier in the MAC layer signaling.

It should be noted that, the BSR in any one of the technical solutions provided above may be understood as a BSR to be transmitted, and the BSR to be transmitted includes at least one of the first BSR and the second BSR.

According to a third aspect, this application provides a terminal. The terminal has a function of implementing behavior of the terminal in the method according to the first aspect. The function may be implemented by hardware, or may be implemented by executing corresponding software by hardware. The hardware or the software includes one or more modules corresponding to the foregoing function.

In a possible design, the terminal may include a processor, memory, a bus, and a communications interface. The memory is configured to store a computer executable instruction. The processor is connected to the memory by using the bus. When the terminal is run, the processor executes the computer executable instruction stored in the memory, to enable the terminal to perform any one of the foregoing methods for transmitting a BSR according to the first aspect.

According to a fourth aspect, a computer-readable storage medium is provided. The computer-readable storage medium is configured to store a computer software instruction used by the foregoing terminal. When the computer-readable storage medium is run on a computer, the computer is enabled to perform any one of the foregoing methods for transmitting a BSR according to the first aspect.

According to a fifth aspect, a computer program product including an instruction is provided. When the computer program product is run on a computer, the computer is enabled to perform any one of the foregoing methods for transmitting a BSR according to the first aspect.

According to a sixth aspect, a network device is provided. The network device has a function of implementing behavior of the network device in the foregoing method embodiment. The function may be implemented by hardware, or may be implemented by executing corresponding software by hardware. The hardware or the software includes one or more modules corresponding to the foregoing function.

In a possible design, the network device may include a processor, memory, a bus, and a communications interface. The memory is configured to store a computer executable instruction. The processor is connected to the memory by using the bus. When the network device is run, the processor executes the computer executable instruction stored in the memory, to enable the network device to perform any one of the foregoing methods for transmitting a BSR according to the second aspect.

According to a seventh aspect, a computer-readable storage medium is provided. The computer-readable storage medium is configured to store a computer software instruction used by the foregoing network device. When the computer-readable storage medium is run on a computer, the computer is enabled to perform any one of the foregoing methods for transmitting a BSR according to the second aspect.

According to an eighth aspect, a computer program product including an instruction is provided. When the computer program product is run on a computer, the computer is enabled to perform any one of the foregoing methods for transmitting a BSR according to the second aspect.

For a technical effect of any one of the apparatuses, the computer readable media, or the computer program products provided above, refer to a technical effect brought about by the corresponding method, and details are not described herein again.

DESCRIPTION OF EMBODIMENTS

First, related technologies and terms in this application are simply described, to help a reader have a better understanding.

A multi-linkage system may include a macro base station, a small cell base station, and a terminal connected to the macro base station and the small cell base station. The macro base station may be configured to ensure and control mobility of the terminal and the like. The small cell base station may be configured to provide a service bearer and the like. The terminal may communicate with a base station (including the macro base station and the small cell base station) through a plurality of beam links. A beam link between the small cell base station and the terminal may be referred to as a small cell link.

Figure 1:
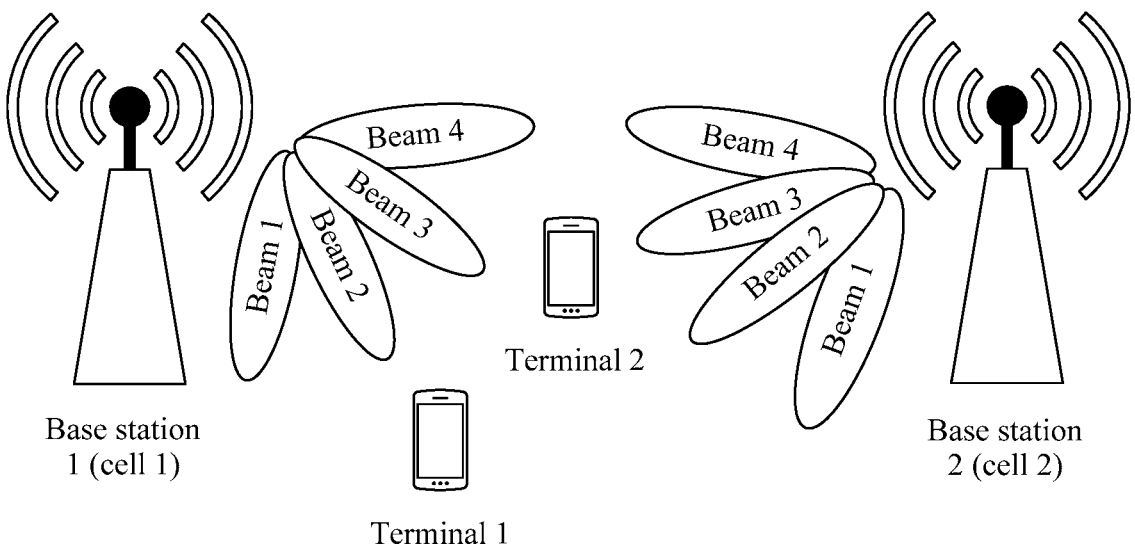
FIG. 1 is a schematic diagram of a system architecture to which the technical solutions are applicable according to this application.

In the multi-linkage system, to provide stable cell coverage, beam radiation of antennas may overlap in space domain. Therefore, the terminal may detect a plurality of beams in a same cell. The terminal within overlapping coverage of a plurality of cells may detect one or more beams in each of the plurality of cells. Each beam corresponds to one beam link. FIG. 1 is a schematic diagram of a multi-linkage system. The multi-linkage system shown in FIG. 1 includes a base station 1, a base station 2, a terminal 1, and a terminal 2. A cell covered by beam radiation of an antenna of the base station 1 is a cell 1, and a cell covered by beam radiation of an antenna of the base station 2 is a cell 2. Beams in each of the cell 1 and the cell 2 include beams 1 to 4. The terminal 1 may detect the beam 1 and the beam 2 in the cell 1. The terminal 2 may detect the beam 4 in the cell 1 and the beam 4 in the cell 2. One of the base stations in FIG. 1 may be a macro base station, and the other base station is a small cell base station; or the base stations in FIG. 1 are both small cell base stations.

It may be understood that, FIG. 1 shows an example of the multi-linkage system, and does not constitute a limitation on the multi-linkage system. For example, a quantity of base stations in the multi-linkage system and a quantity of beams in a cell are not limited in the embodiments of this application, and may be configured based on an actual requirement.

The macro base station and the small cell base station can independently schedule the terminal. Therefore, the terminal needs to separately report a BSR to the two types of base stations. The BSR is used to notify the base station of an amount of data in a buffer of the terminal that needs to be sent. For a terminal, there is a one-to-one correspondence between a beam link and a BSR. To be specific, a same beam link corresponds to one BSR, and different beam links correspond to different BSRs. In the prior art, generally, a terminal triggers reporting of a BSR. For example, when uplink data of the terminal is empty and new data arrives, the terminal reports a BSR, or the terminal periodically reports a BSR, or the terminal reports a BSR when high-priority data arrives. Consequently, it is disadvantageous for a communications system to perform timely scheduling and perform mobility management on the terminal. In addition, in the prior art, a BSR reported by the terminal on a beam link is merely a BSR corresponding to the beam link.

With ultra dense deployment of networks, a concept of a virtual cell is introduced. A plurality of neighboring small cells are logically considered as one virtual cell. When the terminal moves in the virtual cell, no switching is required, and switching is required only when the terminal moves between virtual cells. Generally, in one virtual cell, one primary serving node and a plurality of secondary serving nodes are defined. Each serving node (including the primary serving node and the secondary serving node) is a transmission point or a small cell base station.

At present, in the multi-connectivity system, only the macro base station and the primary serving node in the virtual cell participate in a mobility management process, that is, a movement and handover process of the terminal, or the like. To enhance mobility support by a system, it is expected that a node in addition to the macro base station and the primary serving node in the virtual cell participates in and assists in mobility management.

On this basis, a possible implementation is as follows: The terminal sends a BSR corresponding to a small cell link to help the macro base station or the primary serving node in the virtual cell determine mobility of the terminal more accurately. For example, when communication quality of a small cell link deteriorates, if the macro base station or the primary serving node in the virtual cell learns, based on reporting of a BSR, that there is still a very large amount of data to be transmitted by the terminal, an emergent data bearer (DRB) may be added to a link of the macro base station or the primary serving node, to ensure communication quality of the terminal. For another example, when a BSR of a small cell link reports that there is a relatively small amount of data to be transmitted by the terminal but a service is sensitive to a latency, the macro base station may maintain a current radio bearer before transmission is completed by the terminal, and then perform link switching based on an instantaneous channel state.

In addition, in the multi-connectivity system, reporting a remaining service on the small cell link in a timely manner can help the macro base station or the primary serving node in the virtual cell perform better mobility switching. In a current standard, a cell handover does not trigger reporting of a BSR. The BSR is already triggered by using radio resource control (RRC) signaling. Therefore, a triggering mechanism for a cell handover does not need to be maintained. However, for a multi-connectivity scenario, a cell handover triggers reporting of only a BSR corresponding to a current link, and reporting of a cross-link-BSR is not supported. Therefore, to enhance mobility in the multi-connectivity scenario, a new triggering mechanism supporting reporting of a cross-link-BSR needs to be considered.

On this basis, this application provides a method and an apparatus for transmitting a BSR. A basic principle of the method and the apparatus is as follows: If a terminal receives an instruction message, the terminal reports a BSR according to the instruction message. The BSR includes a common BSR and a cross-beam-link-BSR, and the common BSR is a BSR transmitted on a corresponding beam link. Optionally, a technical solution for triggering reporting of a cross-beam-link-BSR is further provided. Optionally, a format of the reported BSR, and the like are further provided.

The technical solutions provided in the embodiments of this application provide a cross-beam-link transmission mechanism that is also referred to as a cross-beam-link transmission mechanism. To be specific, on a beam link, a BSR corresponding to the beam link and/or a BSR corresponding to another beam link can be transmitted. The beam link may be any beam link used for communication between the terminal and a network side device. It may be understood that, in the embodiments of this application, a BSR that is transmitted on a beam link and corresponding to another beam link is referred to as a cross-beam-link-BSR (cross-beam-link-BSR). The definition is further applicable to a split bearer (separate bearer/split bearer).

Figure 2:
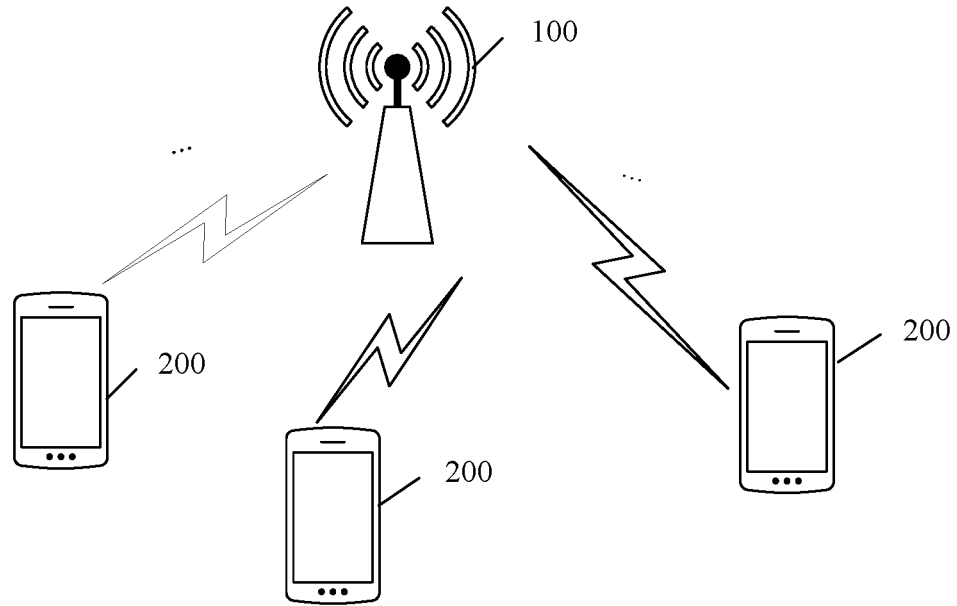
FIG. 2 is a schematic diagram of another system architecture to which the technical solutions are applicable according to this application.

The technical solutions provided in this application may be applied to a system shown in FIG. 2. The system may include one or more network devices 100 and one or more terminals 200. It may be understood that, FIG. 2 is merely an example. A quantity of the network devices 100 and a quantity of the terminals 200 do not constitute a limitation on the technical solutions provided in the embodiments of this application. During actual application, network deployment may be performed by using quantities different from the quantity of the network devices shown in FIG. 2 and the quantity of the terminals shown in FIG. 2 based on a requirement. FIG. 1 may be considered as a specific example of the system to which the technical solutions provided in this application are applicable.

The system shown in FIG. 2 may be various communications systems, for example, current 2G, 3G, and 4G communications systems, a next-generation communications system, and a future evolved network such as a 5G communications system. The system is, for example, a Global System for Mobile Communications (GSM), a code division multiple access, (CDMA) system, a wideband code division multiple access (WCDMA) system, a Time time division multiple access (TDMA) system, a frequency division multiple access (FDMA) system, an orthogonal frequency division multiple access (OFDMA) system, a single carrier frequency division multiple access (SC-FDMA) system, a Long Term Evolution (LTE) system, and another communications system of this type.

The network device 100 may be a base station, and the base station is a device in an access network that communicates with a wireless terminal over an air interface by using one or more sectors. The base station may be configured to perform mutual conversion between a received over-the-air frame and an IP packet, and serve as a router between the wireless terminal and another part in the access network. The another part in the access network may include an Internet Protocol (IP) network. The base station may further coordinate attribute management on the air interface. For example, the base station may be a base transceiver station (BTS) in GSM or CDMA, or may be a NodeB in WCDMA, or may be an evolved NodeB (NodeB or eNB or e-NodeB, evolved NodeB) in LTE. This is not limited in this application. The network device 100 may also be a network device in a future 5G network or a network device in a future evolved PLMN network, or may be a wearable device, an in-vehicle device, or the like. The network device 100 may be a macro base station, a 5G base station, a new radio base station, a small cell base station, a transmission reference point (TRP), or the like.

The terminal 200 may include, but is not limited to, any one of the following: a mobile phone, a tablet computer, a notebook computer, an ultra-mobile personal computer (UMPC), a netbook, a personal digital assistant (PDA), or the like.

Figure 3:
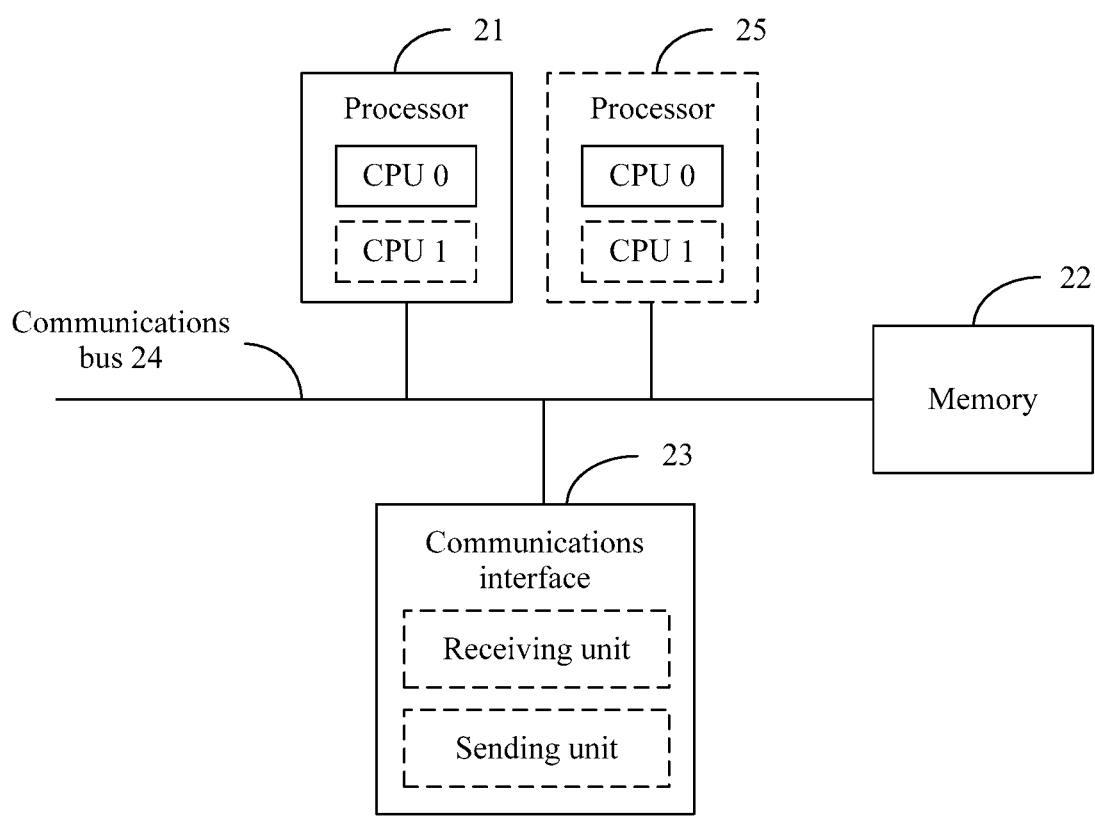
FIG. 3 is a schematic structural diagram of a network device according to an embodiment of this application.

FIG. 3 is a schematic structural diagram of a network device according to an embodiment of this application. The network device shown in FIG. 3 may include at least one processor 21, a memory 22, a communications interface 23, and a communications bus 24.

The processor 21 is a control center of the network device, and may be specifically a processing element or may be a collective name of a plurality of processing elements. For example, the processor 21 may be a central processing unit (central processing unit, CPU), or may be an application-specific integrated circuit (ASIC), or one or more integrated circuits configured to implement the technical solutions provided in the embodiments of this application, for example, one or more microprocessors (DSP) or one or more field programmable gate arrays (FPGA). The processor 21 may run or execute a software program stored in the memory 22, and invoke data stored in the memory 22, to perform various functions of the network device.

In a specific implementation, in an embodiment, the processor 21 may include one or more CPUs, for example, a CPU 0 and a CPU 1 shown in FIG. 3.

In a specific implementation, in an embodiment, the network device may include a plurality of processors, for example, a processor 21 and a processor 25 shown in FIG. 3. Each of the processors may be a single-core processor (single-CPU) or a multi-core processor (multi-CPU). Herein, the processor may be one or more devices, a circuit, and/or a processing core used for data processing (such as a computer program instruction).

The memory 22 may be a read-only memory (read-only memory, ROM), a static storage device of another type that can store static information and an instruction, a random access memory (RAM), or a dynamic storage device of another type that can store information and an instruction, or may be an electrically erasable programmable read-only memory (EEPROM), a compact disc read-only memory (CD-ROM), or another compact disc storage (including a compact disc, a laser disc, an optical disc, a digital versatile disc, a Blu-ray disc, and the like), a magnetic disk storage medium, another magnetic storage device, or any other medium that can be configured to carry or store desired program code in a form of an instruction or a data structure and that is accessible to a computer, but is not limited thereto. The memory 22 may exist independently, or is connected to the processor 21 by using the communications bus 24. The memory 22 may also be integrated with the processor 21. The memory 22 is configured to store a software program to be executed by the network device in the technical solutions provided in the embodiments of this application, and the software program is controlled and executed by the processor 21.

The communications interface 23 may be an apparatus using any transceiver, and is configured to communicate with another device or a communications network such as the Ethernet, a radio access network (RAN), or a wireless local area network (WLAN). The communications interface 23 may include a receiving unit for implementing a receiving function and a sending unit for implementing a sending function.

The communications bus 24 may be an industry standard architecture (ISA) bus, a peripheral component interconnect (PCI) bus, an extended industry standard architecture (EISA) bus, or the like. The bus may be categorized as an address bus, a data bus, a control bus, or the like. For ease of indication, the bus is indicated by using only one bold line in FIG. 3. However, it does not indicate that there is only one bus or only one type of bus.

A structure of the device shown in FIG. 3 does not constitute a limitation on the network device, and may include more or fewer components than those shown in the figure, or some components may be combined, or a different component deployment may be used.

Figure 4:
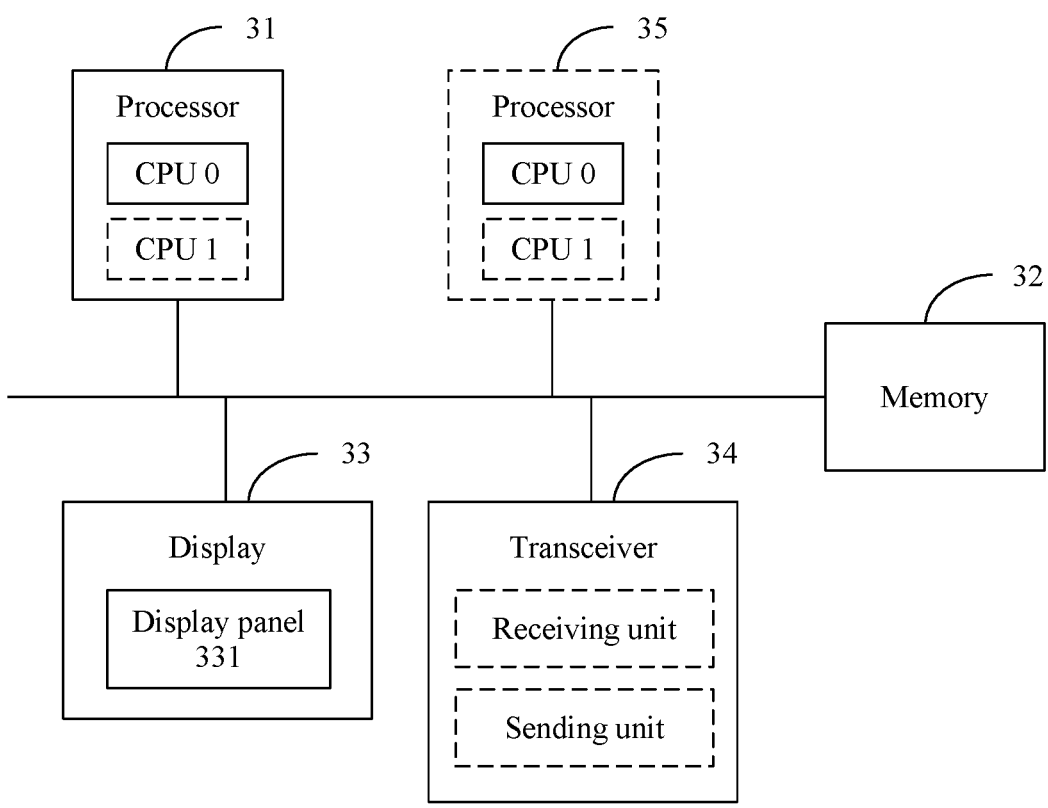
FIG. 4 is a schematic structural diagram of a terminal according to an embodiment of this application.

FIG. 4 is a schematic structural diagram of a terminal according to an embodiment of this application. The terminal shown in FIG. 4 may include at least one processor 31, a memory 32, a display 33, and a transceiver 34.

The processor 31 is a control center of the terminal, and may be a processor or may be a collective name of a plurality of processing elements. The processor 31 may run or execute a software program stored in the memory 32, and invoke data stored in the memory 32, to perform various functions of the terminal. The memory 32 is configured to store a software program to be executed by the terminal in the technical solutions provided in the embodiments of this application, and the software program is controlled and executed by the processor 31.

For related descriptions of the processor 31, the memory 32, and the transceiver 34, refer to the foregoing descriptions, and details are not described herein again.

In a specific implementation, in an embodiment, the processor 31 may include one or more CPUs, for example, a CPU 0 and a CPU 1 shown in FIG. 4.

In a specific implementation, in an embodiment, a terminal may include a plurality of processors, for example, a processor 31 and a processor 35 shown in FIG. 4.

The display 33 may be configured to display information entered by a user or information provided for a user, and various menus of the terminal. The display 33 may include a display panel 331. Optionally, the display panel 331 may be configured by using a liquid crystal display (LCD), an organic light-emitting diode (OLED), or the like.

A structure of the device shown in FIG. 4 does not constitute a limitation on the terminal, and may include more or fewer components than those shown in the figure, or some components may be combined, or a different component deployment may be used. Although not shown, the terminal may further include a battery, a camera, a Bluetooth module, and the like. Details are not described herein.

It should be noted that, a "cell" in this specification may be an actual cell or a virtual cell. The virtual cell may also be referred to as a 5G cell, a TRP group, or the like. An actual cell is coverage of beam radiation of an antenna of one base station, and a virtual cell is a set including a plurality of actual cells, or a sum of coverage of beam radiation of antennas of all base stations in a group including a plurality of base stations, for example, a millimeter-wave cloud cell. In addition, terms such as "link", "linkage", and "connection" in this specification have same meanings. "A plurality of" in this specification means two or more. An example in which the network device is a TRP is used below to describe the technical solutions provided in this application.

Figure 5:
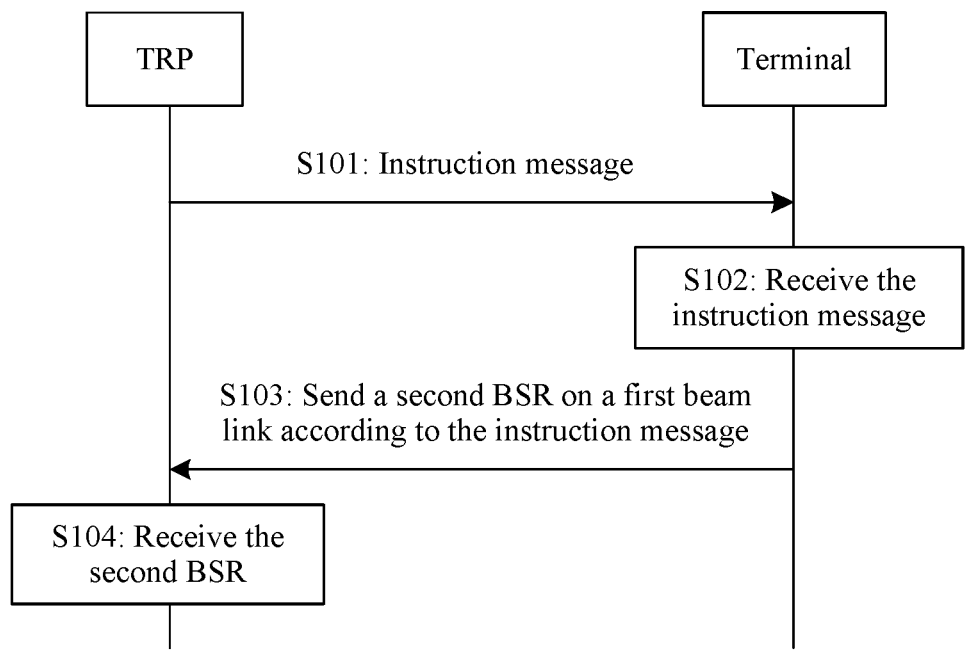
FIG. 5 is a schematic interaction diagram of a method for transmitting a BSR according to an embodiment of this application.

FIG. 5 is a schematic interaction diagram of a method for transmitting a BSR according to an embodiment of this application. The method shown in FIG. 5 may include the following step S101 to step S104.

S101: A TRP sends an instruction message to a terminal. The instruction message is used to instruct the terminal to report a second BSR on a first beam link. The second BSR is a BSR corresponding to a second beam link, and the first beam link is different from the second beam link.

The instruction message may include related indication information of the second BSR.

The related indication information of the second BSR may include an identifier of the second BSR or an identifier of the second beam link corresponding to the second BSR, and is used by the terminal to learn of a BSR to be reported.

Optionally, the related indication information of the second BSR may further include an identifier of a cell corresponding to the second BSR. Beam links in different cells may have a same identifier. For example, identifiers of beam links in a cell 1 are beam links 1 to 4, and identifiers of beam links in a cell 2 are also beam links 1 to 4. Therefore, the instruction message carries the identifier of the cell corresponding to the second BSR, so that the terminal can learn of a cell in which the beam link corresponding to the second BSR is located. Certainly, if beam links in different cells have different identifiers, the instruction message may not include the identifier of the cell corresponding to the second BSR. The cell corresponding to the second BSR may be an actual cell. In this case, the identifier of the cell may be an actual cell ID. The cell corresponding to the second BSR may also be a virtual cell. In this case, the identifier of the cell may be a combination of a virtual cell ID and a relative cell ID of a TRP to which the beam link corresponding to the second BSR belongs in the virtual cell. The relative cell ID is a relative value for distinguishing between different TRPs in the virtual cell. The combination of the virtual cell ID and the relative cell ID can enable the terminal to distinguish a TRP to which the beam link corresponding to the second BSR belongs.

Before performing uplink scheduling and transmission, the TRP may send the instruction message to the terminal.

In an embodiment, when the TRP determines that signal quality of the second beam link deteriorates, for example, when reference signal received power (reference signal received power, RSRP) or reference signal received quality (reference signal received quality, RSRQ) corresponding to the second beam link is less than a first threshold, the instruction message may include the related indication information of the second BSR.

In another embodiment, when no uplink scheduling is performed on the current terminal on the first beam link, the instruction message may include the related indication information related to the second BSR.

The first beam link may be any beam link for communication between the terminal and the TRP. The second beam link may be any beam link for communication between the terminal and the TRP other than the first beam link, or any beam link for communication between the terminal and another TRP.

Figure 6:
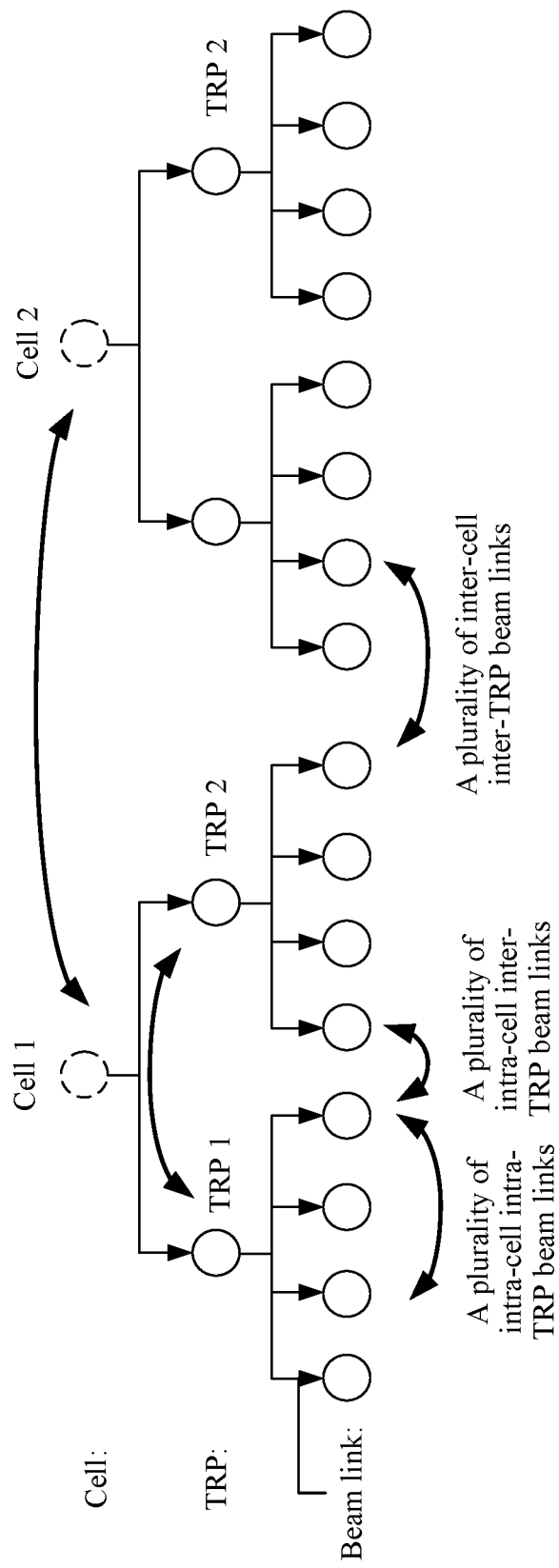
FIG. 6 is a schematic diagram of a scenario related to a cross-beam-link-BSR according to an embodiment of this application.

The instruction message is used to instruct the terminal to report the second BSR on the first beam link. Therefore, the second BSR may be referred to as a cross-beam-link-BSR. A scenario related to reporting of the cross-beam-link-BSR is shown in FIG. 6. To be specific, a relationship between the first beam link and the second beam link may include the following several types:

(1) different beam links in a same TRP in a same cell, namely, a plurality of intra-cell intra-TRP beam links;

(2) different beam links in different TRPs in a same cell, namely, a plurality of intra-cell inter-TRP beam links; and (3) different beam links in different TRPs in different cells, namely, a plurality of inter-cell inter-TRP beam links.

In FIG. 6, the cell 1 and the cell 2 each include two TRPs, that is, coverage of beam radiation of antennas of two TRPs is one cell, and each TRP establishes four beam links. It may be understood that, in two beam links of any type shown in FIG. 6, either of the beam links may be the first beam link, and the other beam link may be the second beam link.

The terminal may determine, in, but not limited to, the following manners, which beam link is the first beam link:

Manner 1: The TRP may send the instruction message on the first beam link.

Manner 2: The instruction message may include related indication information of the first beam link, where the indication information of the first beam link may include an identifier of the first beam link or an identifier of the first BSR. Optionally, the instruction message may further include an identifier of a cell corresponding to the first BSR.

S102: The terminal receives the instruction message sent by the TRP.

Optionally, S101 may include: The TRP sends the instruction message to the terminal by using physical layer signaling, media access control (MAC) signaling, or RRC signaling. Correspondingly, S102 may include: The terminal receives, by using the physical layer signaling, the MAC layer signaling, or the RRC signaling, the instruction message sent by the TR.

S103: The terminal sends a second BSR to the TRP on a first beam link according to the instruction message.

The instruction message is used to indicate that the terminal may transmit a cross-beam-link-BSR. In other words, the technical solutions provided in this application can support transmission of a cross-beam-link-BSR. However, a time at which the terminal sends a cross-beam-link-BSR is not limited in this embodiment of this application. Specifically, in an example, the terminal may send a cross-beam-link-BSR in the following several triggering conditions (that is, the terminal may report the second BSR on the first beam link):

Manner 1: When the terminal sends a measurement report on the first beam link, the terminal sends the second BSR to the TRP on the first beam link according to the instruction message.

The measurement report may trigger mobility management, that is, trigger switching. If the terminal reports the BSR when reporting the measurement report, the TRP can determine mobility of the terminal more accurately. For a specific example thereof, refer to the foregoing descriptions.

Manner 2: When the terminal fails to trigger the second beam link, the terminal sends the second BSR to the TRP on the first beam link according to the instruction message.

When the terminal determines that communication quality of the second beam link is relatively poor, for example, RSRP or RSRQ of the second beam link that is measured by the terminal is less than or equal to a preset threshold, it is considered that the terminal fails to trigger the second beam link. In this case, the terminal needs to find another beam link for communication with a base station. In this case, the terminal may send the second BSR to the TRP on the first beam link according to the instruction message. In this way, a communication latency can be reduced. If the second beam link deteriorates, it means that link switching is required. If a new link is established and then the BSR is reported for communication, a relatively high latency is caused. However, in the technical solutions provided in this application, when the second beam link deteriorates, the BSR of the second beam link may be directly reported on the first beam link, and the TRP may allocate a bearer based on the BSR of the second beam link, for communication. Therefore, the communication latency can be reduced.

Manner 3: When the instruction message is a cross link request, the terminal sends the second BSR to the TRP on the first beam link. The cross link request is a request message provided in this embodiment of this application, and is used to instruct the terminal to report a BSR corresponding to another beam link on the first beam link.

S104: The TRP receives the second BSR sent by the terminal.

Optionally, this application further provides a mechanism for processing the second BSR by the TRP. Details are as follows:

If the TRP determines, based on the second BSR, that there is a very small amount of data to be sent, although the second beam link deteriorates, if the RSRP or the RSRQ of the second beam link is within an acceptable signal strength range, for example, the RSRP or the RSRQ of the second beam link is greater than a second threshold, the second beam link is still retained and link switching is not performed, to avoid interrupting service transmission related to the second BSR on the second beam link. The first threshold is greater than the second threshold.

If the TRP determines, based on the second BSR, that there is a very large amount of data to be sent, when the second beam link deteriorates, if the RSRP/the RSRQ of the second beam link exceeds an acceptable signal strength range, for example, the RSRP or the RSRQ of the second beam link is less than or equal to a second threshold, beam link switching may be performed for the second beam link, and for service transmission related to the second BSR on the second beam link, it may be considered to add a DRB to the first beam link to implement a related service.

It may be understood that, if the TRP sends the instruction message to the terminal, it indicates that the TRP determines that the second beam link deteriorates, and needs to report the BSR of the second beam link, but does not necessarily perform link switching. Specifically, whether link switching is required may be flexibly determined based on an actual status.

It may be understood that, the foregoing processing mechanism is an example, and no limitation is constituted on a processing mechanism.

S103 may include: The terminal sends the second BSR to the TRP on the first beam link according to the instruction message by using physical layer signaling, MAC layer signaling, or RRC signaling. Correspondingly, S104 may include: The TRP sends the second BSR to a TRP on the first beam link by using the physical layer signaling, the MAC layer signaling, or the RRC signaling.

The method for transmitting a BSR provided in this embodiment is specifically a method for transmitting a cross-beam-link-BSR. According to the method, the terminal may send a BSR corresponding to a small cell link, to help a macro base station or a primary serving node in a virtual cell determine mobility of the terminal more accurately, thereby helping enhance mobility management on the terminal.

Figure 7:
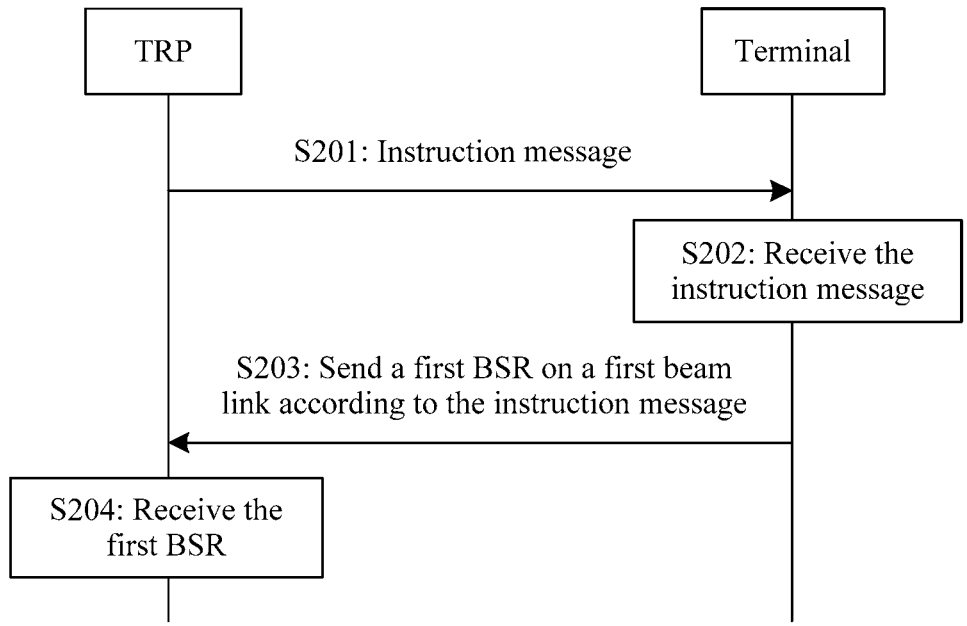
FIG. 7 is a schematic interaction diagram of another method for transmitting a BSR according to an embodiment of this application.

FIG. 7 is a schematic interaction diagram of another method for transmitting a BSR according to an embodiment of this application. The method shown in FIG. 7 may include the following step S201 to step S204.

S201: A TRP sends an instruction message to a terminal, where the instruction message is used to instruct the terminal to report a first BSR on a first beam link. The instruction message may include related indication information of the first BSR.

The related indication information of the first BSR may include an identifier of the first BSR or an identifier of the first beam link corresponding to the first BSR. Optionally, the related indication information of the first BSR may further include an identifier of a cell corresponding to the first BSR. For explanations and descriptions of a reason thereof, refer to the foregoing descriptions, and details are not described herein again.

In an embodiment, when the TRP determines that signal quality of a second beam link is higher than a first threshold, that is, RSRP or RSRQ corresponding to the second beam link is greater than or equal to the first threshold, the instruction message may include the related indication information of the first BSR.

In another embodiment, when uplink scheduling is performed on the current terminal on the first beam link, the instruction message may include the related indication information of the first BSR.

The first beam link may be any beam link for communication between the terminal and the TRP.

S202: The terminal receives the instruction message sent by the TRP.

S203: The terminal sends the first BSR to the TRP on the first beam link according to the instruction message.

S204: The TRP receives the first BSR sent by the terminal.

The method for transmitting a BSR provided in this embodiment is specifically a method for transmitting a BSR corresponding to a current beam link, and the method may be used in combination with the method for transmitting a cross-beam-link-BSR provided in the foregoing embodiment.

Figure 8:
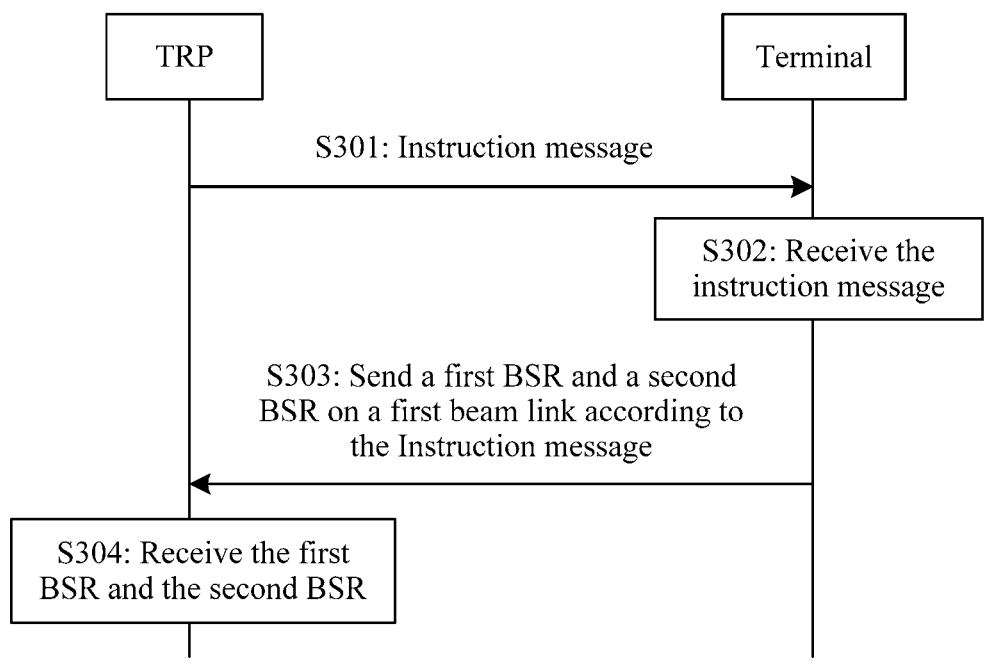
FIG. 8 is a schematic interaction diagram of another method for transmitting a BSR according to an embodiment of this application.

FIG. 8 is a schematic interaction diagram of another method for transmitting a BSR according to an embodiment of this application. The method shown in FIG. 8 may include the following step S301 to step S304.

S301: A base station sends an instruction message to a terminal, where the instruction message is used to instruct the terminal to report a first BSR and a second BSR on a first beam link. The instruction message may include related indication information of the first BSR and related indication information of the second BSR.

In another embodiment, when uplink scheduling is performed on the current terminal on the first beam link, the instruction message may include both the related indication information of the first BSR and the related indication information of the second BSR.

S302: The terminal receives the instruction message sent by the base station.

S303: The terminal sends the first BSR and the second BSR to the base station on the first beam link according to the instruction message.

S304: The base station receives the first BSR and the second BSR sent by the terminal.

The method for transmitting a BSR provided in this embodiment is specifically a method for transmitting a BSR corresponding to a current beam link and a cross-beam-link-BSR, and the method may be combined with the method for transmitting a cross-beam-link-BSR and the method for transmitting a BSR corresponding to a current link provided in the foregoing embodiments.

To support reporting of a cross-beam-link-BSR, this application further provides a format of the BSR. It should be noted that, an example in which the BSR is transmitted by using MAC layer signaling is used below to provide the format of the BSR, and a format of a BSR transmitted by using other signaling is not limited in this application. In addition, any BSR provided below may be implemented by improving any BSR provided in the prior art, for example, a short BSR, a truncated BSR, and a long BSR, or may be a BSR of a newly provided format. Specifically, the format of the BSR provided in this application may include, but is not limited to, any one of the following:

(1) The MAC layer signaling carries at least one of an identifier of a cell corresponding to the BSR and an identifier of a beam link corresponding to the BSR. This manner may be considered as an explicit indication manner.

(2) At least one of an identifier of a cell corresponding to the BSR and an identifier of a beam link corresponding to the BSR is indicated by using a logical channel identifier in the MAC layer signaling. This manner may be considered as an implicit indication manner. A correspondence between the logical channel identifier and at least one of the identifier of the cell corresponding to the BSR and the identifier of the beam link corresponding to the BSR may be configured by using RRC signaling, or predefined, or configured in another manner. This is not limited in this application.

Optionally, a new logical channel identifier is defined or configured in a format of the MAC signaling, and at least one of the identifier of the cell corresponding to the BSR and the identifier of the beam link corresponding to the BSR is indicated by using the logical channel identifier. The optional implementation is applicable to a scenario of multiplexing of a long BSR.

Optionally, existing logical channel identifiers in the MAC layer signaling are classified, and some of the logical channel identifiers may be used to indicate at least one of the identifier of the cell corresponding to the BSR and the identifier of the beam link corresponding to the BSR. The optional implementation is applicable to a scenario of multiplexing of a short BSR.

The foregoing mainly describes the solutions provided in the embodiments of this application from a perspective of interaction between network elements. It may be understood that, to implement the foregoing functions, the network elements, such as the network device or the terminal, include a corresponding hardware structure and/or software module for performing each of the functions. A person skilled in the art should be easily aware that units and algorithm steps in the examples described with reference to the embodiments disclosed in this specification may be implemented in a form of hardware or in a form of a combination of hardware and computer software in this application. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of this application.

In this embodiment of this application, functional modules of the network device or the terminal may be divided based on the foregoing method example. For example, each function module may be divided according to corresponding functions, or two or more functions may be integrated into one processing module. The integrated module may be implemented in a form of hardware, or may be implemented in a form of a functional module of software. It should be noted that the module division in the embodiments of this application is an example, and is merely logical function division. There may be another division manner in an actual implementation.

Figure 9:
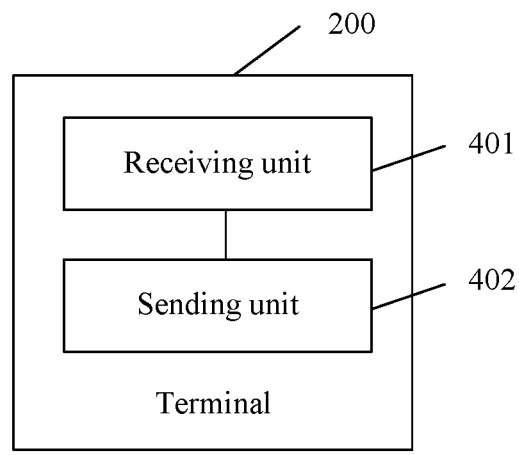
FIG. 9 is a schematic structural diagram of another terminal according to an embodiment of this application.

For example, when function modules corresponding to various functions are obtained through division, FIG. 9 shows a possible schematic structural diagram of the terminal 200 in the foregoing embodiment. The terminal 200 includes a receiving unit 401 and a sending unit 402.

The receiving unit 401 is configured to receive an instruction message, where the instruction message is used to instruct the terminal 200 to report a BSR (namely, a BSR to be transmitted), the BSR includes at least one of a first BSR and a second BSR, the first BSR is a BSR corresponding to a first beam link, and the second BSR is a BSR corresponding to a second beam link.

The sending unit 402 is configured to report the BSR on the first beam link according to the instruction message.

Optionally, the BSR includes the second BSR; and the sending unit 402 may be specifically configured to: when the terminal 200 sends a measurement report on the first beam link, report the second BSR on the first beam link according to the instruction message.

Optionally, the BSR includes the second BSR; and the sending unit 402 may be specifically configured to: when the terminal 200 fails to trigger the second beam link, report the second BSR on the first beam link according to the instruction message.

Optionally, the BSR includes the second BSR; and the receiving unit 401 may be specifically configured to receive a cross link request, where the cross link request is used to instruct the terminal 200 to report, on the first beam link, a BSR corresponding to another beam link.

Optionally, the receiving unit 401 may be specifically configured to receive the instruction message by using physical layer signaling, MAC layer signaling, or RRC signaling.

Optionally, the instruction message may include an identifier of the BSR or an identifier of a beam link corresponding to the BSR.

Optionally, the instruction message may further include an identifier of a cell corresponding to the BSR.

Optionally, the sending unit 402 may be specifically configured to report the BSR on the first beam link according to the instruction message by using physical layer signaling, MAC layer signaling, or RRC signaling Optionally, if the sending unit 402 reports the BSR on the first beam link according to the instruction message by using the MAC layer signaling, a format of the BSR includes any one of the following: the MAC layer signaling carries at least one of the identifier of the cell corresponding to the BSR and the identifier of the beam link corresponding to the BSR; or at least one of the identifier of the cell corresponding to the BSR and the identifier of the beam link corresponding to the BSR is indicated by using a logical channel identifier in the MAC layer signaling.

All related content of each step in the foregoing method embodiments may be cited in function descriptions of a corresponding function module. Details are not described herein again.

In this embodiment of this application, the terminal is presented in a form of obtaining, through division, each function module corresponding to each function, or the terminal is presented in a form of obtaining each function module through division in an integrated manner. The "unit"

herein may be an application-specific integrated circuit (application-specific integrated circuit, ASIC), a circuit, a processor that executes one or more software or firmware programs and a memory, an integrated logic circuit, and/or another device that can provide the foregoing functions. In a simple embodiment, a person skilled in the art may figure out that the terminal 200 may use the form shown in FIG. 4. For example, the receiving unit 401 and the sending unit 402 in FIG. 9 may be implemented by using the communications interface 23 in FIG. 4.

Figure 10:
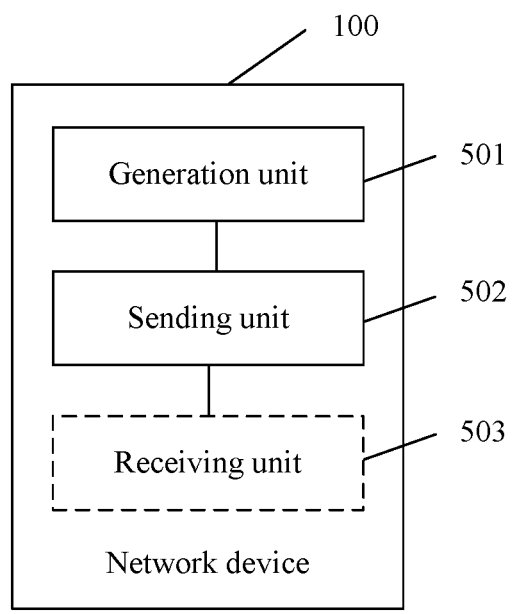
FIG. 10 is a schematic structural diagram of another network device according to an embodiment of this application.

For example, when function modules corresponding to various functions are obtained through division, FIG. 10 shows a possible schematic structural diagram of the network device 100 in the foregoing embodiment. The network device 100 may include a generation unit 501 and a sending unit 502.

The generation unit 501 is configured to generate an instruction message, where the instruction message is used to instruct a terminal to report a buffer status report BSR to be transmitted, the BSR includes at least one of a first BSR and a second BSR, the first BSR is a BSR corresponding to a first beam link, and the second BSR is a BSR corresponding to a second beam link.

The sending unit 502 is configured to send the instruction message to the terminal.

Optionally, the sending unit 502 may be specifically configured to send the instruction message to the terminal by using physical layer signaling, MAC layer signaling, or RRC signaling.

Optionally, the network device 100 may further include a receiving unit 503, configured to receive, by using physical layer signaling, MAC layer signaling, or RRC signaling, the BSR reported by the terminal.

Optionally, the instruction message may include an identifier of the BSR or an identifier of a beam link corresponding to the BSR.

Optionally, the instruction message may further include an identifier of a cell corresponding to the BSR.

All related content of each step in the foregoing method embodiments may be cited in function descriptions of a corresponding function module. Details are not described herein again.

In this embodiment of this application, the network device is presented in a form of obtaining, through division, each function module corresponding to each function, or the network device is presented in a form of obtaining each function module through division in an integrated manner. The "unit" herein may be an ASIC, a circuit, a processor that executes one or more software or firmware programs and a memory, an integrated logic circuit, and/or another device that can provide the foregoing functions. In a simple embodiment, a person skilled in the art may figure out that the network device 100 may use the form shown in FIG. 3. For example, the generation unit 501 in FIG. 10 may be implemented by using the processor 21 in FIG. 3. Specifically, the generation unit 501 may be executed by the processor 21 by invoking application program code stored in the memory 22. This is not limited in this embodiment of this application. For another example, the sending unit 502 and the receiving unit 503 may be implemented by using the communications interface 23 in FIG. 3.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

Although this application is described with reference to the embodiments, in a process of implementing this application that claims protection, a person skilled in the art may understand and implement other variations of the disclosed embodiments by viewing the accompanying drawings, disclosed content, and the accompanying claims. In the claims, "comprising" does not exclude another component or another step, and "a" or "one" does not exclude a case of a plurality. A single processor or another unit may implement several functions enumerated in the claims. The fact that some measures are recited in mutually different dependent claims does not indicate that a combination of these measures cannot bring better effects.

Although this application is described with reference to specific features and the embodiments thereof, obviously, various modifications and combinations may be made to them without departing from the scope of this application. Correspondingly, the specification and accompanying drawings are merely examples for description of this application defined by the claims, and are intended to cover any of or all modifications, variations, combinations or equivalents within the scope of this application. Obviously, a person skilled in the art can make various modifications and variations to this application without departing from the spirit and scope of this application. In this way, this application is intended to cover these modifications and variations of this application provided that they fall within the scope of protection defined by the following claims and their equivalent technologies of this application.

What is claimed is:

1. A method for transmitting a buffer status report (BSR), comprising:

receiving, by a terminal, an instruction message, wherein the instruction message is used to instruct the terminal to report a BSR, the BSR comprises at least one of a first BSR or a second BSR, the first BSR is a BSR corresponding to a first beam link, and the second BSR is a BSR corresponding to a second beam link; and reporting, by the terminal, the BSR on the first beam link according to the instruction message, wherein the BSR comprises the second BSR, and wherein the second BSR is reported on the first beam link and is the BSR corresponding to the second beam link, and the first beam link is different from the second beam link.

2. The method according to claim 1, wherein the reporting, by the terminal, the BSR on the first beam link according to the instruction message comprises:
   after the terminal sends a measurement report on the first beam link, reporting, by the terminal, the second BSR on the first beam link according to the instruction message.

3. The method according to claim 1, wherein the reporting, by the terminal, the BSR on the first beam link according to the instruction message comprises:
   after the terminal fails to trigger the second beam link, reporting, by the terminal, the second BSR on the first beam link according to the instruction message.

4. The method according to claim 1, wherein the receiving, by the terminal, the instruction message comprises:
   receiving, by the terminal, a cross link request, wherein the cross link request is used to instruct the terminal to report, on the first beam link, a BSR corresponding to another beam link.

5. The method according to claim 1, wherein the receiving, by the terminal, the instruction message comprises:
   receiving, by the terminal, the instruction message using physical layer signaling, Media Access Control (MAC) layer signaling, or Radio Resource Control (RRC) signaling.

6. The method according to claim 1, wherein the instruction message comprises an identifier of the BSR or an identifier of a beam link corresponding to the BSR.

7. The method according to claim 6, wherein the instruction message further comprises an identifier of a cell corresponding to the BSR.

8. The method according to claim 1, wherein the reporting, by the terminal, the BSR on the first beam link according to the instruction message comprises:
   reporting, by the terminal, the BSR on the first beam link according to the instruction message using physical layer signaling, MAC layer signaling, or RRC signaling.

9. The method according to claim 8, wherein the terminal reports the BSR on the first beam link according to the instruction message using the MAC layer signaling; and a format of the BSR comprises any one of the following:
   the MAC layer signaling carries at least one of an identifier of a cell corresponding to the BSR or an identifier of a beam link corresponding to the BSR; or
   at least one of the identifier of the cell corresponding to the BSR or the identifier of the beam link corresponding to the BSR is indicated using a logical channel identifier in the MAC layer signaling.

10. A method comprising:
   generating, by a network device, an instruction message, wherein the instruction message is used to instruct a terminal to report a buffer status report (BSR), the BSR comprises at least one of a first BSR or a second BSR, the first BSR is a BSR corresponding to a first beam link, and the second BSR is a BSR corresponding to a second beam link;
   sending, by the network device, the instruction message to the terminal; and
   receiving, by the network device, the second BSR on the first beam link according to the instruction message, wherein the second BSR is received from the first beam link and is the BSR corresponding to the second beam link, and the first beam link is different from the second beam link.

11. The method according to claim 10, wherein the sending, by the network device, the instruction message to the terminal comprises:
   sending, by the network device, the instruction message to the terminal using physical layer signaling, Media Access Control (MAC) layer signaling, or Radio Resource Control (RRC) signaling.

12. The method according to claim 10, wherein the method further comprises:
   receiving, by the network device using physical layer signaling, MAC layer signaling, or RRC signaling, the BSR reported by the terminal.

13. The method according to claim 10, wherein the instruction message comprises an identifier of the BSR or an identifier of a beam link corresponding to the BSR.

14. The method according to claim 13, wherein the instruction message further comprises an identifier of a cell corresponding to the BSR.

15. A terminal, comprising:
   a receiver configured to receive an instruction message, wherein the instruction message is used to instruct the terminal to report a buffer status report (BSR) to be transmitted, the BSR comprises at least one of a first BSR or a second BSR, the first BSR is a BSR corresponding to a first beam link, and the second BSR is a BSR corresponding to a second beam link; and
   a transmitter configured to report the BSR on the first beam link according to the instruction message, wherein the BSR comprises the second BSR, and wherein the second BSR is reported on the first beam link and is the BSR corresponding to the second beam link, and the first beam link is different from the second beam link.

16. The terminal according to claim 15, wherein the transmitter is configured to: after sending a measurement report on the first beam link, report the second BSR on the first beam link according to the instruction message.

17. The terminal according to claim 15, wherein the transmitter is configured to: after the terminal fails to trigger the second beam link, report the second BSR on the first beam link according to the instruction message.

18. The terminal according to claim 15, wherein the receiver is configured to receive a cross link request, wherein the cross link request is used to instruct the terminal to report, on the first beam link, a BSR corresponding to another beam link.

19. The terminal according to claim 15, wherein
   the receiver is configured to receive the instruction message using physical layer signaling, Media Access Control (MAC) layer signaling, or Radio Resource Control (RRC) signaling.

20. The terminal according to claim 15, wherein the instruction message comprises an identifier of the BSR or an identifier of a beam link corresponding to the BSR.

* * * * *